Jan. 22, 1929.

O. PROLLIUS

LIQUID HEATER

Filed Nov. 3, 1924

Inventor:
Otto Prollius
by [signature]
Attorney.

Patented Jan. 22, 1929.

1,699,919

UNITED STATES PATENT OFFICE.

OTTO PROLLIUS, OF BERGEDORF, NEAR HAMBURG, GERMANY, ASSIGNOR TO THE FIRM BERGEDORFER EISENWERK, AKTIENGESELLSCHAFT, OF SAUDE, NEAR BERGEDORF, GERMANY.

LIQUID HEATER.

Application filed November 3, 1924, Serial No. 747,592, and in Germany May 16, 1924.

My invention relates to liquid heaters and more particularly to a heater in which the liquid trickles down a plurality of superimposed heating elements which may be tubular and heated on the inside by water of suitable temperature.

Heaters of this kind are as a rule employed in the heating of milk or other liquids which contain gases in solution.

Heaters of this type involve the drawback that a very considerable loss by evaporation is incurred at high temperature. In order to overcome this drawback it has been proposed to provide such heaters with jackets adapted to collect the vapors. With this expedient however another drawback is connected, viz, the gases are retained in the liquid. It is well known that a liquid such as milk contains gases in solution and also readily absorbs air. It is therefore necessary to remove these gases before the final heating of the liquid. Obviously this is impossible if the heater is jacketed. Milk heated in such jacketed devices is not satisfactory and particularly lacks flavour.

These drawbacks are overcome according to my invention by subdividing the irrigation heater into several groups, for instance two, one of which serves for the preliminary heating of the milk and is unjacketed, while the other group in which the milk is finally heated to a higher temperature, is surrounded by a jacket which collects the vapours as described. When the milk trickles down the first group, the gases dissolved in it are liberated under the influence of the elevated temperature of the heating elements practically without any evaporation taking place while in the second group where the milk is finally heated to a higher temperature and intense evaporation occurs, losses are prevented by the jacket.

In the drawings affixed to this specification and forming part thereof a heater embodying my invention is illustrated diagrammatically by way of example.

Figure 1:
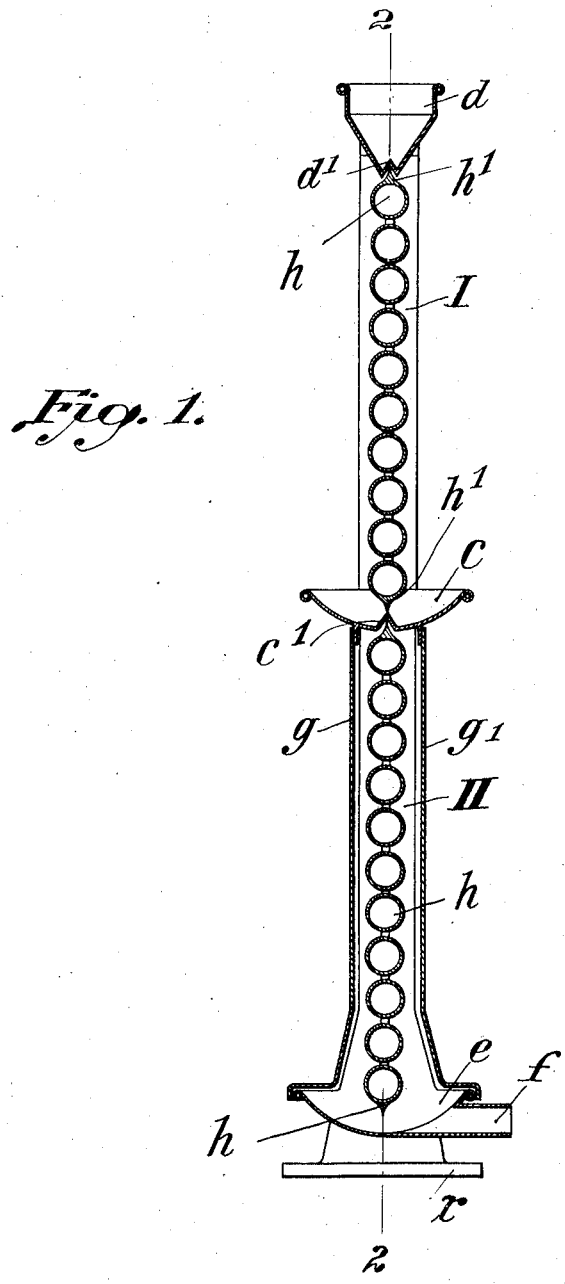
Fig. 1 is a vertical cross section.
Figure 2:
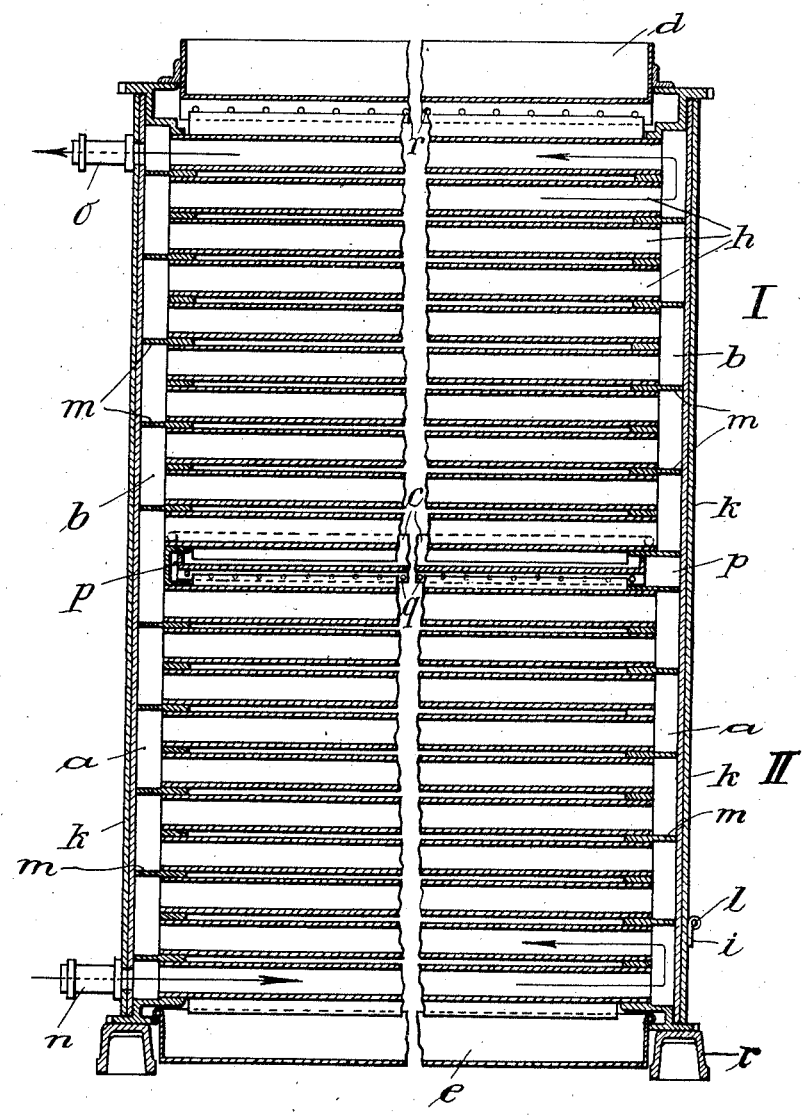
Fig. 2 is a longitudinal section on the line 2—2 of Fig. 1.

The heater comprises a plurality of tubular superposed heating elements $h$ which are subdivided into two groups I and II. The ends of the elements $h$ in each group are connected with heating chambers $a$ and $b$. The chambers are subdivided into compartments of two elements each by partitions $m$ which are arranged in staggered relation on opposite ends of the heater so that the heating medium which enters the heating chamber $a$ at the bottom through a pipe $n$, is conducted through the tubular elements $h$ of the groups I and II in a zigzag path, and discharged through a pipe $o$ at the top of the heating chamber $b$. The medium obviously transfers part of its heat to the liquid so that the temperature gradually decreases from the bottom to the top of the apparatus and the liquid is accordingly subjected to gradual heating, the hottest zone being at the bottom of the group II. The pitch of the tubular elements $h$ is extended where the groups I and II adjoin, and at this point a distributing vessel $c$ is arranged between the two groups and provided with a bottom in the shape of an inverted V, perforations $q$ being provided at either side of the V-shaped portion so that the milk or other liquid trickles down on both sides of the heating elements. A similar vessel $d$ which also comprises a bottom $d'$ in the shape of the letter W in cross section, and having perforations $r$ at either side above the top heating element $h$, is arranged at the top of group I. The first and last heating element of each group is provided with a deflecting rib $h'$ at its top and bottom respectively, which serves for guiding the liquid on its way down the heating elements. The lower group II is surrounded by a jacket $g, g^1$. A third collecting tank $e$ is arranged at the bottom of the second group $a$ and provided with a discharge pipe $f$. The heater is mounted on a foundation plate $r$ and is provided with cover plates $k$ at both ends.

The operation of the heater is as follows:

The heating medium such as hot water, is supplied to the elements of the first group I by a suitable pipe $n$. It flows from the bottom of the group to its top while the liquid, to be heated, such as milk, trickles down from the upper tank $d$, which distributes the milk over the heater.

When the milk has passed the upper group it is collected in the intermediate tank $c$ in preheated condition. The temperature of the first heating stage is moderate so that evaporation occurs only to a limited extent as the temperature is not high enough to cause evaporation; on the other hand the gases dissolved therein are liberated and the condition of the milk is improved.

From the collecting tank *c* the milk reaches the tubes *h* of the second group II in which water of higher temperature is circulating. Here the milk is partly evaporated, but, as the elements of this stage are entirely encased in the jacket *g*, *g¹*, the vapors formed cannot escape but are condensed at the walls of the jacket and recovered so that the excessive losses heretofore involved are avoided.

Obviously I may treat in the manner described any liquid other than milk and I may provide any number of groups or stages for the priliminary and for the final heating of the liquid.

I wish it to be understood that I do not desire to be limited to the exact details of construction shown and described, for obvious modifications will occur to a person skilled in the art.

I claim:—

Liquid heater comprising two superposed groups of tubular heating elements arranged in series in the path of the liquid to be heated, the surface of the upper group being open to the air, and a jacket enclosing the lower group.

In testimony whereof I affix my signature.

OTTO PRÖLLIUS.